(No Model.)

G. F. SIMONDS.
BALL BEARING.

No. 466,436. Patented Jan. 5, 1892.

Witnesses.
Robert Everett,
Dennis Sumby.

Inventor.
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 466,436, dated January 5, 1892.

Application filed April 23, 1891. Serial No. 390,154. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

My invention relates to a bearing comprising a series or group of spherical rollers or balls arranged in position to bear against and roll upon concentric surfaces for the purpose of supporting or resisting radial pressure, and another series or group of such balls arranged to bear against and roll upon plane surfaces for the purpose of supporting or resisting thrust or end pressure.

The invention consists in the construction and combination of parts in a ball-bearing, as hereinafter set forth, whereby the balls for relieving the effects of friction are free to revolve in all directions between the detachably-connected ring and shouldered tubular or annular piece by which they are confined and with which they are removable in a body from the shaft or axle or other rotary or stationary part to which said balls and confining devices may be applied.

Figure 1:
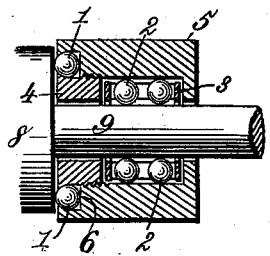
Figure 2:
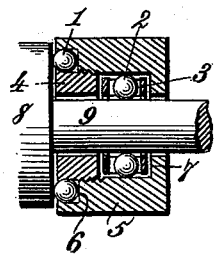
Figure 3:
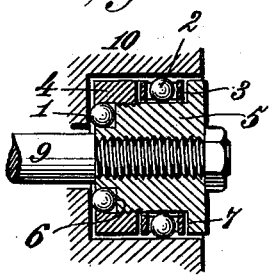

In the annexed drawings, illustrating the invention, Figure 1 is a sectional view of a ball-bearing embodying my present improvements, the shaft or axle and the parts that confine the balls being so arranged that either the shaft or the ball-confining devices will be free to revolve, showing also an annular cage in which the balls for resisting radial pressure are carried independently of the shaft or axle, and the detachably-connected ring and shouldered tubular piece in which said cage and both groups of balls are confined so as to be removable in a body. Fig. 2 is a similar view showing only a single series of balls for sustaining radial pressure. Fig. 3 is a similar view showing the detachably-connected ring and shouldered tubular piece detachably secured to the shaft or axle and surrounded by a bearing or a stationary or rotary part.

Referring to the drawings, the numeral 1 designates the spherical rollers or balls for resisting thrust or end pressure, 2 the spherical rollers or balls for sustaining radial pressure, and 3 an annular ball-carrying cage in which the balls for supporting or resisting radial pressure are placed, so that they can be handled in a body and be free to revolve in all directions and bear against and roll upon the concentric surfaces between which they are located.

The numeral 4 denotes a ring that is screw-threaded for a portion of its width, either externally, as shown in Figs. 1 and 2, or internally, as shown in Fig. 3, the said ring 4 being thus adapted to be detachably connected with a corresponding internally or externally screw-threaded portion of a shouldered tubular or annular piece 5, which, together with the ring 4, is adapted to surround a shaft or axle. It will be seen that the ring 4 may thus be located either within one end of the shouldered tubular piece 5, as shown in Figs. 1 and 2, or on the outside of one end of said shouldered tubular piece, as shown in Fig. 3, the screw-threaded connection in either case permitting them to be readily joined or separated. The tubular piece 5 is provided near one end with an internal or external annular shoulder 6 and at or near its other end with an internal or external annular shoulder 7, according to the position in which the ring 4 is to be attached. The annular shoulder 6 forms one of the plane surfaces, against which the balls 1 bear and upon which they roll for the purpose of resisting or sustaining thrust or end pressure, the other plane surface being formed either by the side of a collar 8 on a shaft or axle 9, as shown in Figs. 1 and 2, or by the interior of a bearing 10 or other stationary or rotary part, as shown in Fig. 3. The annular shoulder 7 and the opposite face or end of the detachable ring 4 serve to confine the annular cage 3, in which are located the balls 2, that bear against and roll upon concentric surfaces, as shown, for the purpose of supporting or resisting radial pressure. It will thus be seen that the ring 4 and tubular shouldered piece 5 are so arranged and connected as to form two annular channels or cavities for receiving the two separate and distinct sets or groups of balls for sustaining end-thrust and radial pressure. The annular channel or cavity for receiving the balls 1 is formed mostly in the end of the tubular shouldered piece 5 and is completed by the attached ring 4, and in order to hold these balls in position and yet permit them to revolve freely in all directions the adjacent or opposite outer edges of the ring 4 and tubular piece 5 are flared toward each other, as shown, so as to contract the open side of the annular cavity in which the balls 1 are placed, and thereby prevent them from falling out when the parts 4 and 5 are handled or removed from the shaft. The cage 3 for holding the balls 2 is arranged in the annular channel or cavity formed by the ring 4 and the shoulder 7 of the tubular piece 5, and this channel may be either internal, as shown in Figs. 1 and 2, or external, as shown in Fig. 3. In the cage 3 may be placed a single circular series or group of balls 2 for sustaining radial pressure, as shown in Figs. 2 and 3; or, as shown in Fig. 1, said cage may contain more than one circular series or group of balls.

It is obvious that the detachably-connected ring 4 and shouldered tubular piece 5 may be arranged either to rotate or to be at rest with relation to the shaft or axle or other stationary or rotary part to which said devices are applied.

As shown in Figs. 1 and 2, the ball-confining parts 4 and 5 may be separated from the shaft or axle, either being free to rotate on the other; or as shown in Fig. 3, the said detachably-connected parts 4 and 5 may be detachably secured either to a fixed or rotary shaft. In Fig. 3 I have shown the shouldered tubular piece 5 and the shaft or axle 9 fastened together by a screw-threaded connection; but it is obvious that they may be detachably connected by other means.

By referring to the drawings it will be seen that the separate and distinct sets of balls for resisting end-thrust and sustaining radial pressure are arranged in circular series or groups of different diameters and in different planes, and that, while they are free to revolve in all directions and bear only at two diametrically-opposite points in contact with their respective plane and concentric bearing-surfaces, they are also capable of being removed in a body with the connected ring 4 and tubular piece 5, which form part of the bearing-surfaces. This arrangement of spherical rollers or balls and their confining devices is applicable to rotary or stationary shafts or axles, wheels, pulleys, and other situations where it is desirable to largely diminish the frictional effects of thrust and radial pressure.

What I claim as my invention is—

In a ball-bearing, the combination of a circular group of balls for resisting end-thrust, a circular group of balls for sustaining radial pressure, an annular cage in which the balls for sustaining radial pressure are retained, a shouldered tubular piece, and a ring detachably connected to said tubular piece and forming therewith in one end of the bearing an annular channel or cavity adapted to retain the balls for resisting end-thrust in position to revolve freely in all directions and bear only at two diametrically-opposite points in operative contact with parallel plane bearing-surfaces, said detachably-connected ring and shouldered tubular piece forming, also, an annular channel or cavity, in which are received the caged balls that roll freely in all directions upon and between parallel concentric bearing-surfaces and bear thereon only at two diametrically-opposite points to sustain radial pressure, the two distinct groups of balls being arranged on different diameters and in different planes, substantially as shown and described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.